June 24, 1941.  C. A. PHELPS  2,246,858
BOX COVERING MACHINE
Filed Jan. 18, 1940  5 Sheets-Sheet 1
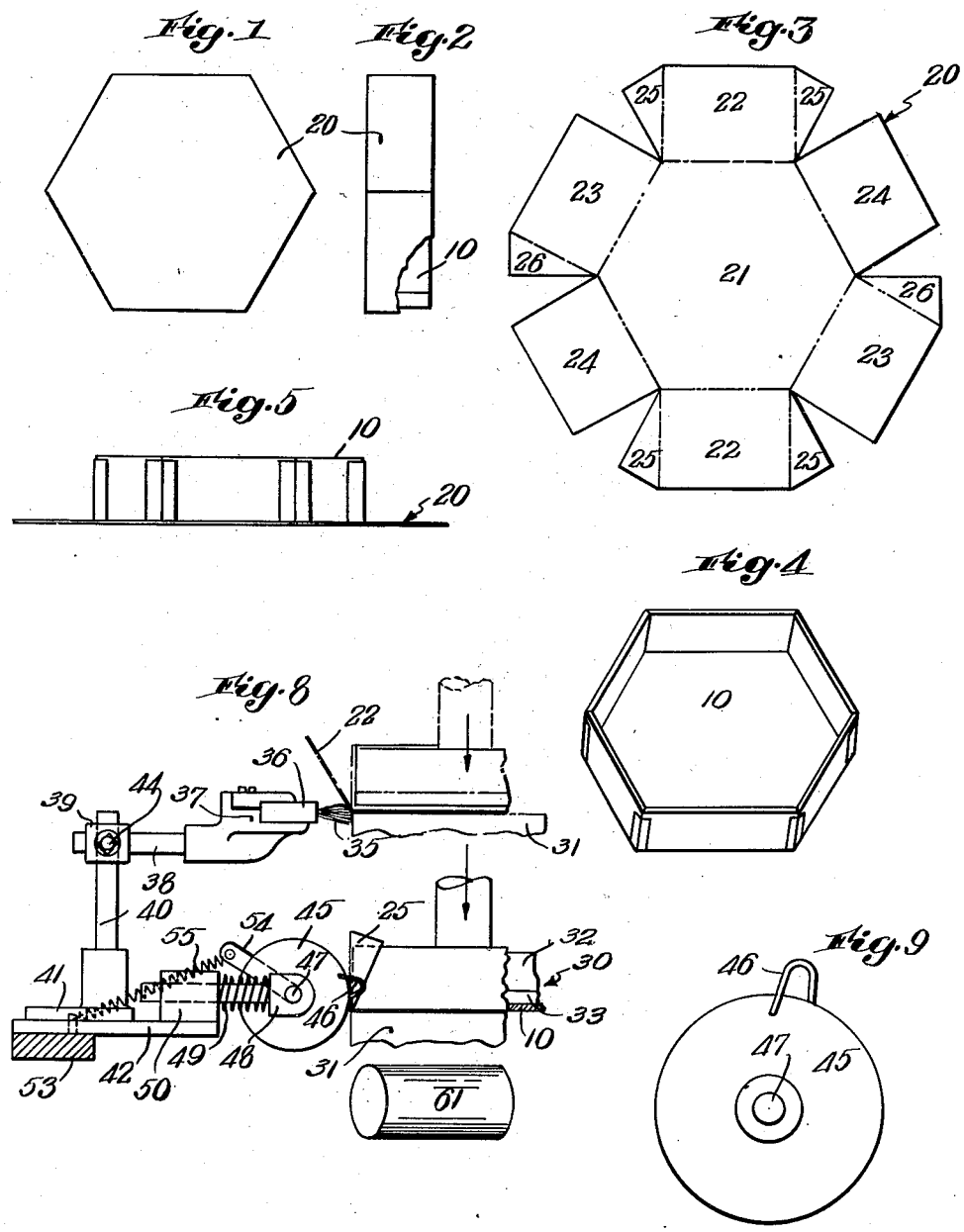
Inventor
Charles A. Phelps

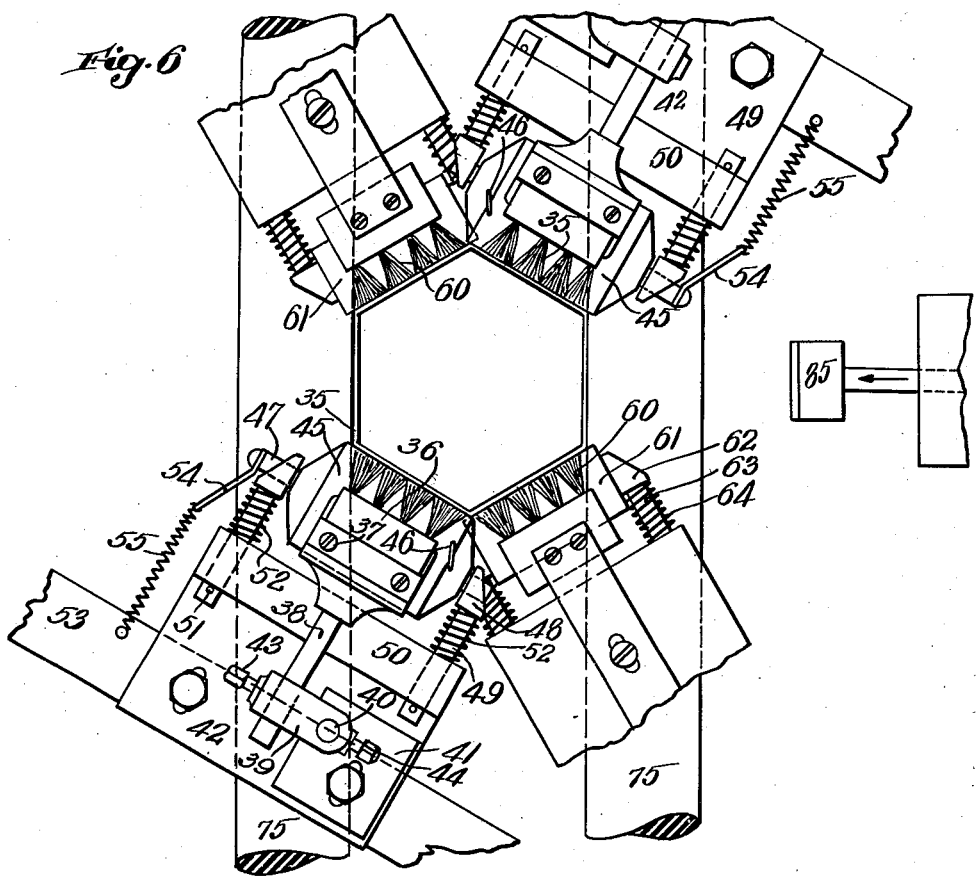
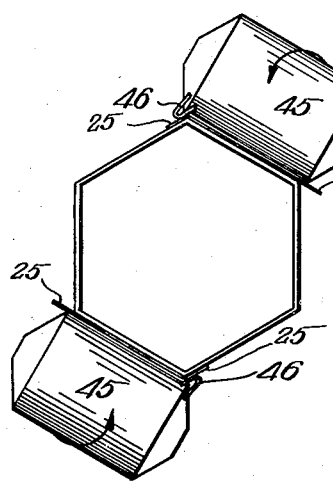

June 24, 1941.  C. A. PHELPS  2,246,858
BOX COVERING MACHINE
Filed Jan. 18, 1940  5 Sheets-Sheet 3
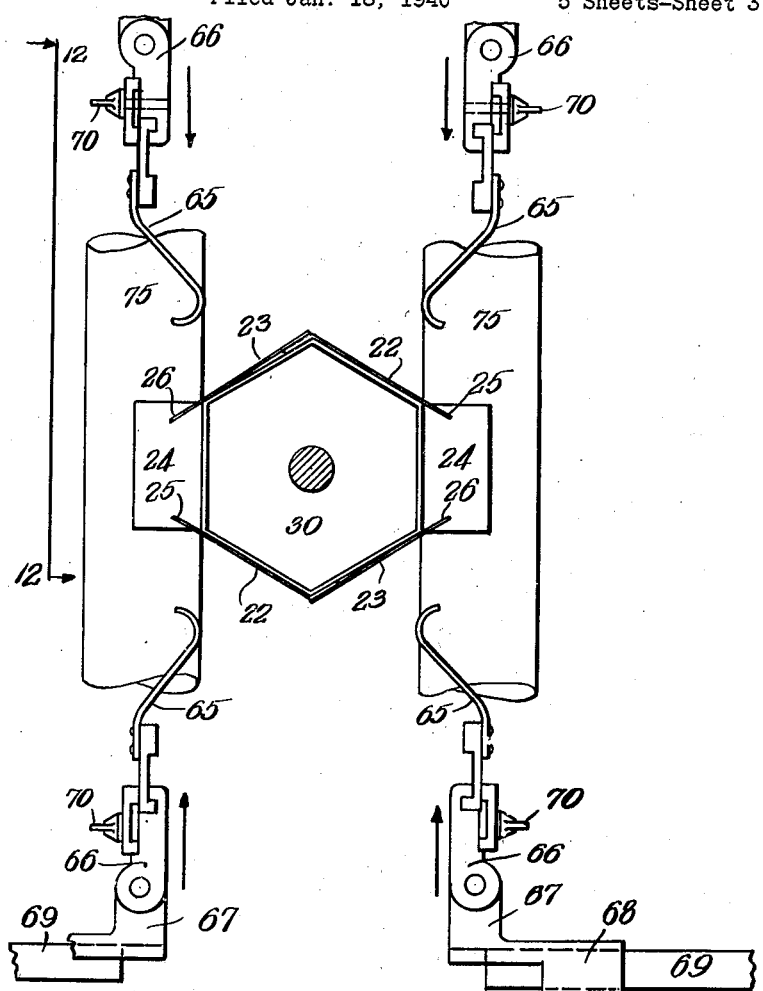
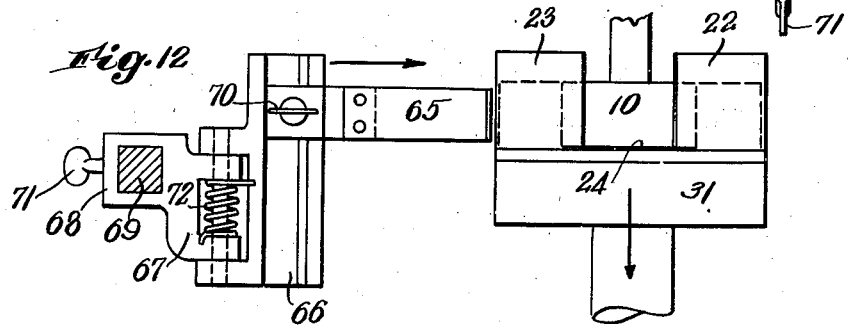
Inventor
Charles A. Phelps
by Roberts, Cushman & Woodbury
his Attys.

June 24, 1941.  C. A. PHELPS  2,246,858
BOX COVERING MACHINE
Filed Jan. 18, 1940   5 Sheets-Sheet 4
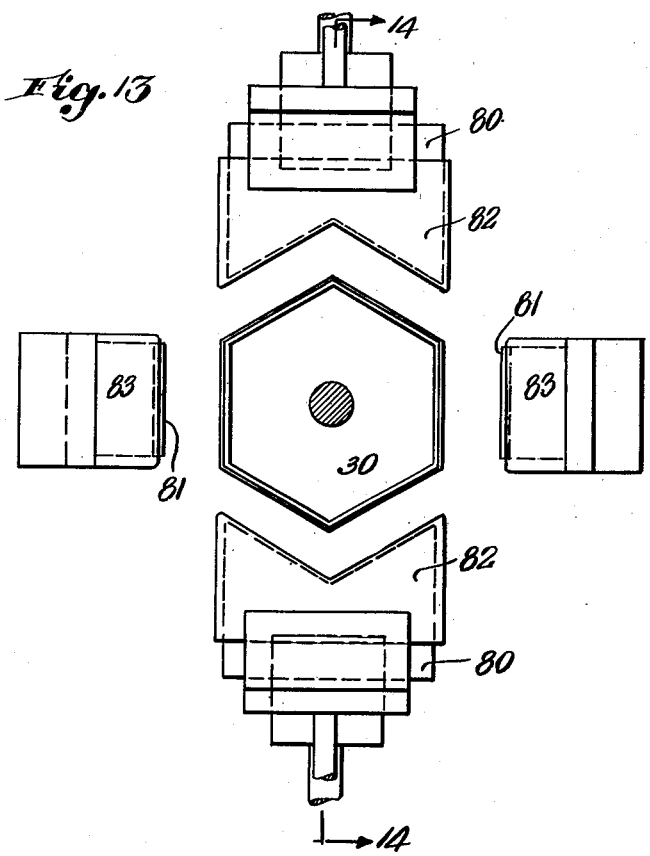
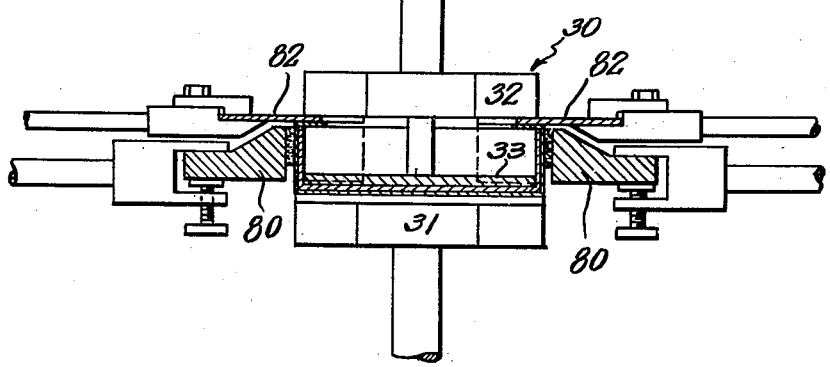
Inventor
Charles A. Phelps
by Roberts, Cushman & Woodbury.
his Attys.

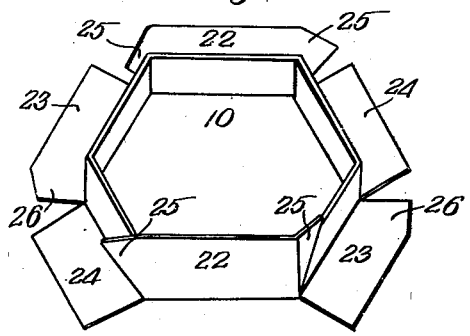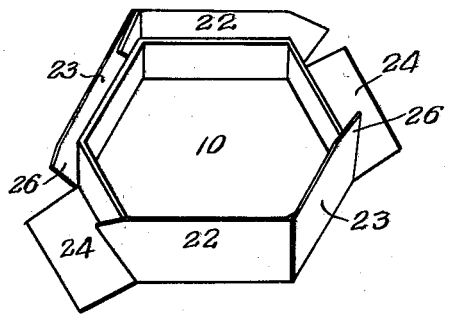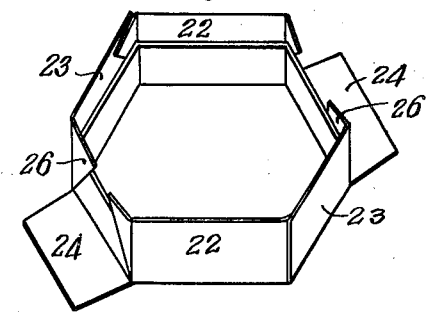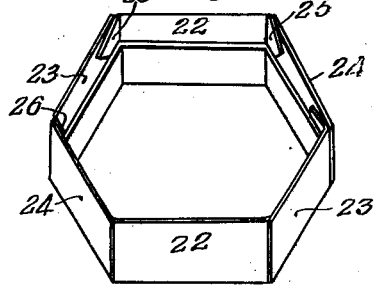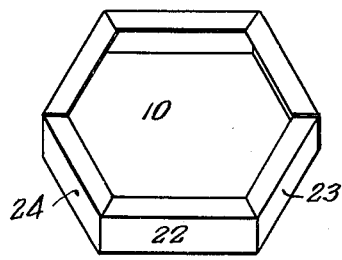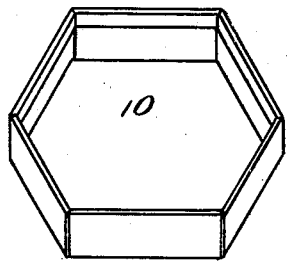

Patented June 24, 1941

2,246,858

UNITED STATES PATENT OFFICE 2,246,858

BOX COVERING MACHINE

Charles A. Phelps, Salem, Mass., assignor to Parker Brothers, Incorporated, Salem, Mass., a corporation of Maine Application January 18, 1940, Serial No. 314,396

10 Claims. (Cl. 93—54.2)

This invention relates to an improvement in box covering machines, and more particularly in machines by which boxes other than those rectangular in form are covered.

Machines for covering rectangular boxes are old and well known, but such machines cannot be used successfully in covering boxes of other forms, as for example hexagonal boxes, because the corner angles are not right angles and hence the folders and wipers which move perpendicularly to the box being covered cannot function successfully at the corners of the box.

The primary object of this invention is the provision of a machine having a plurality of covering instrumentalities by which the covering material is smoothly laid against the walls of boxes other than rectangular in form, e. g. hexagonal.

A further object of this invention is to provide in a box covering machine a single element which rotates to lay the side of the covering material against a wall of the box and to lay a portion of such material around a corner and against an adjacent wall and which thereafter remains stationary to act as a wiper as the box is moved past such element.

These and other objects of the invention will be apparent from a consideration of the following description of a machine adapted to cover a hexagonal box and of the accompanying drawings which form a part thereof and in which:

Figs. 1 and 2 are respectively a plan view and a side elevation with parts broken away of a hexagonal box covered by a machine embodying this invention;

Fig. 3 is a plan view of a blank by which such box is covered;

Fig. 4 is a perspective view of the box to be covered;

Fig. 5 is a side elevation of the box shown in Fig. 4 placed upon the blank shown in Fig. 3 in the proper position for the covering operation;

Fig. 6 is a plan view of the elements of the machine by which the primary group of covering operations are performed;

Fig. 7 is a plan view of a detail of the machine showing the elements by which one of said operations is performed;

Fig. 8 is a side elevation, on a smaller scale, of one set of the elements shown in Fig. 6;

Fig. 9 is an enlarged end view of one of the elements shown in Fig. 7;

Fig. 10 is a view in side elevation of another element which takes part in the primary covering operations;

Fig. 11 is a plan view of the elements by which the secondary group of such operations are performed;

Fig. 12 is a view in side elevation, taken along the line 12—12 in Fig. 11, of certain of such elements;

Fig. 13 is a plan view of the elements by which the tertiary group of covering operations are performed;

Fig. 14 is a cross-sectional view taken along the line 14—14 in Fig. 13 with the elements in a more advanced position than is shown in Fig. 13; and Figs. 15 to 20, inclusive, are perspective views of a box illustrating various stages in the covering thereof.

Machines for covering boxes are old and well known and embody many elements in common. In setting forth this invention such elements which obviously form no part of this invention will not be described or shown except incidentally and only so far as is necessary for a full appreciation of the invention. While the invention will be shown and described as applied to the covering of a hexagonal box, it obviously is not limited thereto and may be applied to the covering of other forms of boxes if so desired.

The box 10 (Figs. 4 and 5) is to be covered by a blank 20 (Figs. 3 and 5), such blank having a hexagonally outlined base 21 indicated by dotted lines and diametrically opposed pairs of flaps 22, 23 and 24, by which the side walls of the box are to be covered. The flaps 22 each have tabs 25 at opposite side edges, the flaps 23 each have a single tab 26 at one side edge, and the flaps 24 have no such tabs.

The surface of the blank which comes into contact with the box is rendered adhesive in any desired manner, and the box and blank are assembled in the manner shown in Fig. 5. The box with its blank is then placed upon an upper form or die 30 and clamped in position thereon by a lower form 31. The upper form 30 comprises a top block 32 and a middle block 33. These forms are reciprocated vertically by means (not shown) and present the box and blank to the various covering instrumentalities, as will be set forth below.

The box and blank so clamped between the forms pass between wipers 35 (Figs. 7 and 8) by which the flaps 22 are laid against the side walls of the box. Each wiper 35, here shown as a brush, is carried in a block 36 clamped between jaws 37 at the end of a rod 38. The rod 38 is mounted in an arm 39 carried by a post 40, the base 41 of which is bolted to a plate 42. Set screws 43 and 44 permit the adjustment of the rod 38 and arm 39, respectively.

The box with its blank then descends between rollers 45, each roller having an ear or horn 46 at one end thereof. The roller 45 is fixed to a rock shaft 47 carried at its ends in bearings 48 at the ends of rods 49. The rods 49 extend through holes in a bar 50 and are held against inadverent separation therefrom by pins 51. Expansion springs 52 surrounding the rods 49 yieldably advance the rollers 45 away from the bar 50. The bar 50 is fixed to the plate 42 and the latter bolted to the frame of the machine, as for example a bar 53. Secured to one end of the rock shaft 47 is one end of a strap 54, the other end of which is connected by a contraction spring 55 to the bar 53. As the box descends between the rollers 55, the frictional contact of the rollers with the box set up by the expansion springs 52 rotates the rollers against the urge of the springs 55. This rotation of the rollers 45 causes the ear 46 on each roller to engage a tab 25 on the flap 22 and wipe it into contact with the box wall, as shown in Fig. 7. Each spring 55 is so made that when its roller 45 reaches the position shown in Fig. 8 with the ear 46 substantially horizontal, the further rotation of the roller is prevented and the rollers 45 remain stationary while the box with its blank descends (see Fig. 15).

It will be noted that each ear 46 is obliquely mounted upon its roller 45 with the leading edge farther from the adjacent end than the following edge. Hence when the roller 45 is turned first the leading edge of the ear 46 engages the tab 25 at its line of joinder with the flap 22 and smooths that tab firmly against the box wall. Moreover, to allow for the angular relation of the side wall of the box to which the flap 22 is secured to that side wall to which the tab 25 is secured, the ear 46 is inclined to the axis of the roller 45; the present machine being adapted to cover hexagonal boxes, the ear 46 is inclined at substantially 120° from such axis (see Fig. 7). Consequently when the rotation of the roller is stopped by the spring 55 the following edge of the ear is parallel to the side wall of the box to which the tab 25 is to be applied so that as the box with its blank descends the leading edge of the ear again wipes the tab firmly against that side wall. In brief, the ears 46 perform three operations upon the tabs 25, first they bend the tabs on their lines of joinder with the flaps 22, second they smooth the tabs against the box walls, and third they wipe or iron the tabs against such walls.

The box with its blank now descends between the wipers 60 and rollers 61 by which the flaps 23 are raised into engagement with the side walls of the box, thus covering the tabs 25 set by the ears 46. The wipers 60 are, like the wipers 35, brushes suitably mounted in the path of the box and cover. The rollers 61 are supported in bearings 62 carried by rods 63 and yieldably held by springs 64 in the path of the box and cover (see Fig. 10).

The box with its cover is now brought to rest between the pairs of wiper arms 65 by which the remaining tabs 25 on the flaps 22 and the tabs 26 on the flaps 23 are bent and laid against the uncovered walls of the box (Figs. 11 and 12). Each wiper 65 is here shown as a flexible metal blade adjustably fixed at one end to a block 66 pivoted upon an arm 67 of a sleeve 68 adjustably mounted upon a bar 69. Set screws 70 and 71 permit the adjustment of the blade 65 relative to the block 66 and of the sleeve 68 relative to the bar 69, and a spring 72 acts to hold the blade 65 yieldably in position. The bars 69 are advanced toward and from the box by suitable means, not shown, but so timed that the wipers 65 are simultaneously advanced to fold down the tabs 25 and 26 when the box with its cover is at rest (see Fig. 17).

After the tabs 25 and 26 have been wiped into place the box with its cover descends between the rollers 75 by which the flaps 24 of the cover blank are wiped into contact with the side walls of the box and cover the tabs 25 and 26 (see Fig. 18).

The box with its blank now descends between the edge turn-in tools and presser blocks and comes to rest. The top block 32 of the upper form is raised out of the box while the middle block 33 thereof clamps it against the lower form 31 (see Figs. 13 and 14). The presser blocks 80 and 81 are brought into contact with the side walls and the edge turn-in plates 82 and 83 bend the projecting edges of the cover blank inwardly at right angles to the box (see Fig. 19). The top block 32 then descends to rest upon the turn-in plates 82 and 83. The plates 82 and 83 are then retracted and the top block 32 reenters the box wiping the inturned edges against the inner surfaces of the side walls of the box. The presser blocks 82 and 83 are thereupon further advanced and coact with the top form 31 to set the inturned edges in place (see Fig. 20).

It will be noted that the edges of the turn-in plates 82 are angularly concaved so that they act simultaneously upon the edges of the flaps 22 and 23 and that the faces of the presser blocks 80 are similarly formed. The movements of the various elements are controlled by any suitable mechanism. The plates 83 and blocks 81, however, act merely upon the flaps 24 and are accordingly suitably formed.

The forms 30 and 31 are then actuated to return the covered box to the initial loading position above the wipers 35 in front of the kick-off plunger 85 (Fig. 6). The upper form 30 is raised from out of the box and it is knocked from the lower form 31 and out of the machine by the plunger 85.

While one embodiment of this invention has been shown and described in detail, it will be understood that the invention is not limited thereto and that other embodiments may be made without departing from the spirit and scope thereof as set forth in the following claims.

I claim:

1. A machine for covering a hexagonal box with a cover blank having three diametrically opposed pair of flaps adapted to be secured to the side walls of the box, said machine comprising a pair of movable forms between which the box to be covered is clamped, and a plurality of covering instrumentalities past which the box with its blank is carried by said forms, said instrumentalities including three pair of successively operating rollers, each pair acting to smooth a pair of flaps of the cover blank against diametrically opposed side walls of the box, and ears mounted upon one pair of rollers by which ear tabs carried by the flaps smoothed by the rollers are wiped into contact with adjacent side walls of the box.

2. A machine for covering a hexagonal box with a cover blank having three diametrically opposed pair of flaps adapted to be secured to the side walls of the box, said machine comprising a pair of movable forms between which the box to be covered is clamped, and a plurality of covering instrumentalities past which the box with its blank is carried by said forms, said instrumentalities including three pair of successively operating rollers, each pair acting to smooth a pair of flaps of the cover blank against diametrically opposed side walls of the box, said rollers being rotatable by the box with its blank as it passes, ears mounted upon one pair of rollers by which ear tabs carried by the flaps smoothed by the rollers are wiped into contact with adjacent side walls of the box, and means for stopping the rotation of that pair of rollers when the tabs have been wiped for holding the rollers and ears in contact with the blank on the travelling box and for returning such rollers to a predetermined position after the box has been carried past them.

3. A machine for covering a hexagonal box with a cover blank having three diametrically opposed pair of flaps adapted to be secured to the side walls of the box and tabs on certain pairs of flaps adapted to be secured to the side walls adjacent those to which such flaps are secured and prior to the securing of other flaps to such walls, said machine comprising a pair of movable forms between which the box to be covered is clamped, and a plurality of covering instrumentalities past which the box with its blank is carried by said forms, said instrumentalities including three pair of successively operating rollers, each pair acting to smooth a pair of flaps of the cover blank against side walls of the box, and means carried by the first pair of rollers by which tabs of the flaps smoothed thereby are applied to adjacent side walls of the box.

4. A machine for covering a hexagonal box with a cover blank having three diametrically opposed pair of flaps adapted to be secured to the side walls of the box and tabs on certain pairs of flaps adapted to be secured to the side walls adjacent those to which such flaps are secured and prior to the securing of other flaps to such walls, said machine comprising a pair of movable forms between which the box to be covered is clamped, and a plurality of covering instrumentalities past which the box with its blank is carried by said forms, said instrumentalities including three pair of successively operating rollers, each pair acting to smooth a pair of flaps of the cover blank against side walls of the box, and means carried by the first pair of rollers by which tabs of the flaps smoothed thereby are applied to adjacent side walls of the box, and wiper fingers acting between the second and third pair of rollers to apply the tabs of the previously smoothed flaps to the walls of the box upon which the remaining pair of flaps are to be smoothed by the third pair of rollers.

5. In a box covering machine wherein the box with its cover blank is carried by forms past covering instrumentalities, a roller by which a flap of a cover blank is smoothed against the side wall of a box, said roller being mounted for rotation by frictional contact of the box and its blank as it passes the roller, and means for yieldably holding the roller in a predetermined position and permitting the rotation of the roller by the box and its blank to a limited amount into a position in contact with the flap in which position it remains stationary until the box and its blank have passed whereby the flap is smoothed against the side wall of the box.

6. In a box covering machine wherein the box with its cover blank is carried by forms past covering instrumentalities, a roller by which a flap of a cover blank is smoothed against the side wall of a box, said roller being mounted for rotation by frictional contact of the box and its blank as it passes the roller, and means for yieldably holding the roller in a predetermined position and permitting the rotation of the roller by the box and its blank to a limited amount into a position in contact with the flap in which position it remains stationary until the box and its blank have passed whereby the flap is smoothed against the side wall of the box, said means including a contraction spring.

7. In a box covering machine wherein the box with its cover blank is carried by forms past covering instrumentalities, a roller by which a flap of a cover blank is smoothed against the side wall of a box, said roller being mounted for rotation by frictional contact of the box and its blank as it passes the roller, and means for yieldably holding the roller in a predetermined position and permitting the rotation of the roller by the box and its blank to a limited amount into a position in contact with the flap in which position it remains stationary until the box and its blank have passed whereby the flap is smoothed against the side wall of the box, said means including a strip secured to the roller and rotatable therewith, and a contraction spring acting upon said strip.

8. In a box covering machine wherein the box with its cover blank is carried by forms past covering instrumentalities, a roller by which a flap of a cover blank is smoothed against the side wall of a box, said roller being mounted for rotation by frictional contact of the box and its blank as it passes the roller, means yieldably holding the roller in a predetermined position and permitting its rotation by the box to a limited amount into a position in contact with the flap in which position it remains stationary until the box and its blank have passed whereby the flap is smoothed against the side wall of the box, and an ear on said roller, which ear is upright when the roller is in such predetermined position and is carried into engagement with a tab at the end of the flap smoothed by said roller, to bend said tab into contact with a side wall of the box as the roller is rotated, and to smooth said tab against said wall when the roller is held stationary and the box with its blank moves past the roller.

9. In a box covering machine wherein the box with its cover blank is carried by forms past covering instrumentalities, a roller by which a flap of a cover blank is smoothed against the side wall of a box, said roller being mounted for rotation by frictional contact of the box and its blank as it passes the roller, means yieldably holding the roller in a predetermined position and permitting its rotation by the passing box to a limited amount into a position in contact with the flap in which position it remains stationary until the box and its blank have passed whereby the flap is smoothed against the side wall of the box, and an ear on said roller, which ear has a leading edge and a following edge and is mounted in a position so inclined to the axis of the roller that the leading edge is nearer the adjacent end of the roller than the following edge, said ear being carried by the rotation of the roller into engagement with a tab at the end of the flap smoothed by the roller, whereby the leading edge of the ear bends the tab into contact with a wall of the box as the roller is rotated and the following edge of the ear smooths the bent tab against that wall when the roller is held stationary and the box with its blank moves past the roller.

10. In a box covering machine wherein the box with its cover blank is carried by forms past covering instrumentalities, a roller by which a flap of a cover blank is smoothed against the side wall of a box, said roller being mounted for rotation by frictional contact of the box and its blank as it passes the roller, means yieldably holding the roller in a predetermined position and permitting its rotation by the passing box to a limited amount, and an ear on said roller, which ear has a leading edge and a following edge and is mounted in a position so inclined to the axis of the roller that the leading edge is nearer the adjacent end of the roller than the following edge and that the following edge is at an angle of approximately 120° to the axis, said ear being carried by the rotation of the roller into engagement with a tab at the end of the flap smoothed by the roller, whereby the leading edge of the ear bends the tab into contact with a wall of the box as the roller is rotated and the following edge of the ear smoothes the bent tab against that wall when the roller is held at rest and the box with its blank moves past the roller.

CHARLES A. PHELPS.